(12) United States Patent
Nishiwaki et al.

(10) Patent No.: US 10,009,447 B2
(45) Date of Patent: Jun. 26, 2018

(54) ELECTRONIC APPARATUS

(71) Applicant: KYOCERA CORPORATION, Kyoto (JP)

(72) Inventors: Masahiko Nishiwaki, Sakai (JP); Yasuo Nambu, Osaka (JP); Shohei Iwamoto, Higashiosaka (JP)

(73) Assignee: KYOCERA CORPORATION, Kyoto (JP)

( * ) Notice: Subject to any disclaimer, the term of this patent is extended or adjusted under 35 U.S.C. 154(b) by 0 days. days.

(21) Appl. No.: 15/413,159

(22) Filed: Jan. 23, 2017

(65) Prior Publication Data
US 2017/0134546 A1 May 11, 2017

Related U.S. Application Data

(63) Continuation of application No. PCT/JP2015/078669, filed on Oct. 8, 2015.

(30) Foreign Application Priority Data

Oct. 28, 2014 (JP) .................................. 2014-219494

(51) Int. Cl.
H04B 1/00 (2006.01)
H04M 1/02 (2006.01)
H04B 1/3888 (2015.01)

(52) U.S. Cl.
CPC .......... *H04M 1/026* (2013.01); *H04B 1/3888* (2013.01)

(58) Field of Classification Search
CPC .... H04B 1/03; H04B 1/08; H04B 2001/3894; H04B 2001/3872; H01L 41/053; Y10T 29/49155; H04R 17/00
See application file for complete search history.

(56) References Cited

U.S. PATENT DOCUMENTS

| 8,816,981 | B2 | 8/2014 | Kai et al. | |
| 2012/0289162 | A1* | 11/2012 | Hosoi | H04R 25/606 |
| | | | | 455/41.3 |

FOREIGN PATENT DOCUMENTS

| JP | 2003-145048 | | 5/2003 | |
| JP | 2008-252878 | * | 10/2008 | ............. H04R 17/00 |
| JP | 2011-053745 | | 3/2011 | |
| JP | 2014-057264 | | 3/2014 | |
| JP | 2014-082792 | | 5/2014 | |
| JP | 2014-082792 | * | 8/2014 | ............... H04R 1/00 |

OTHER PUBLICATIONS

International Search Report in international application No. PCT/JP2015/078669, dated Nov. 10, 2015, in 1 page.
Written Opinion of the International Searching Authority in PCT/JP2015/078669, dated Nov. 10, 2015, and Statement of Non-English References Cited Therein, in 4 pages.

* cited by examiner

*Primary Examiner* — Ping Hsieh
(74) *Attorney, Agent, or Firm* — Duane Morris LLP

(57) ABSTRACT

An electronic apparatus is disclosed. An electronic apparatus comprises a panel, a piezoelectric vibrator, a component, and a cushioning material. The panel is located on a surface of the electronic apparatus. The piezoelectric vibrator is located on an inner surface of the panel. The component faces the piezoelectric vibrator. The cushioning material is located between the piezoelectric vibrator and the component such that a gap is formed between the piezoelectric vibrator and the cushioning material.

6 Claims, 8 Drawing Sheets

F I G. 5
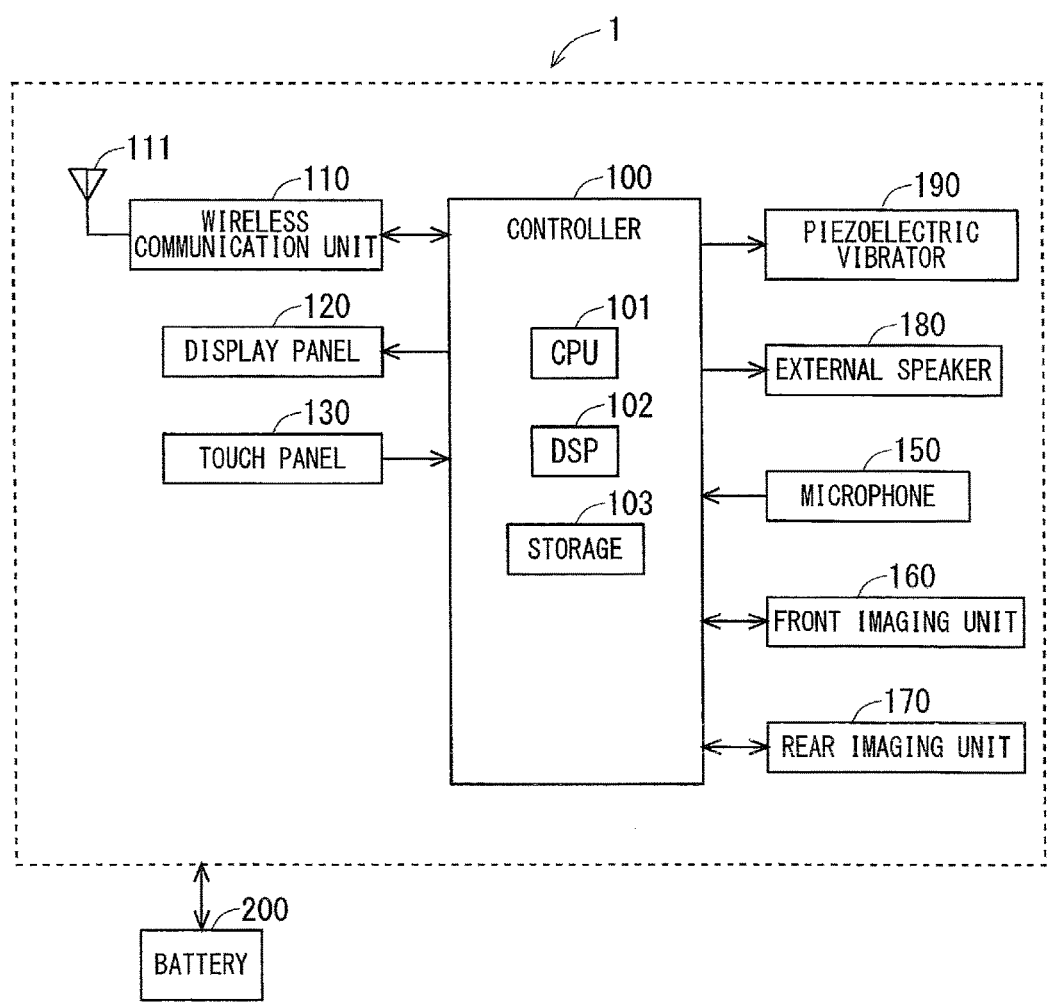

F I G. 1 1
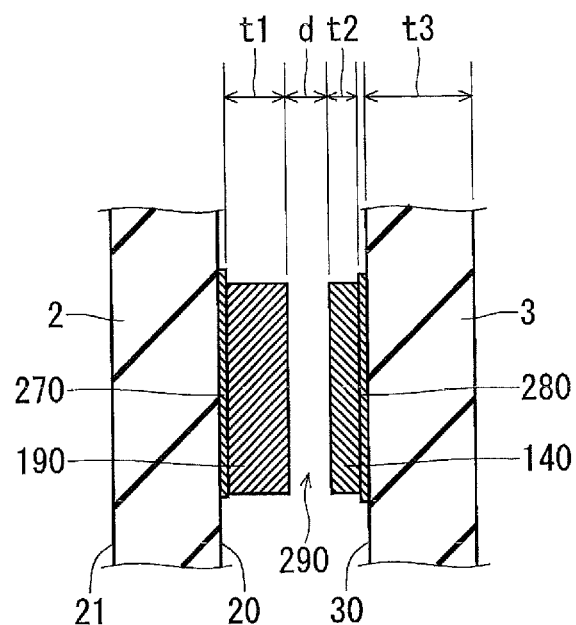
F I G. 1 2
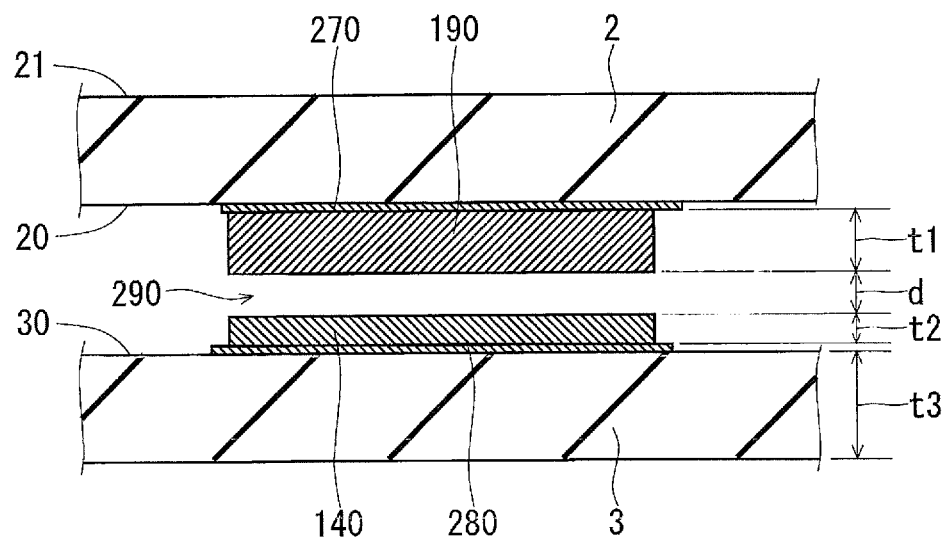

F I G . 1 5
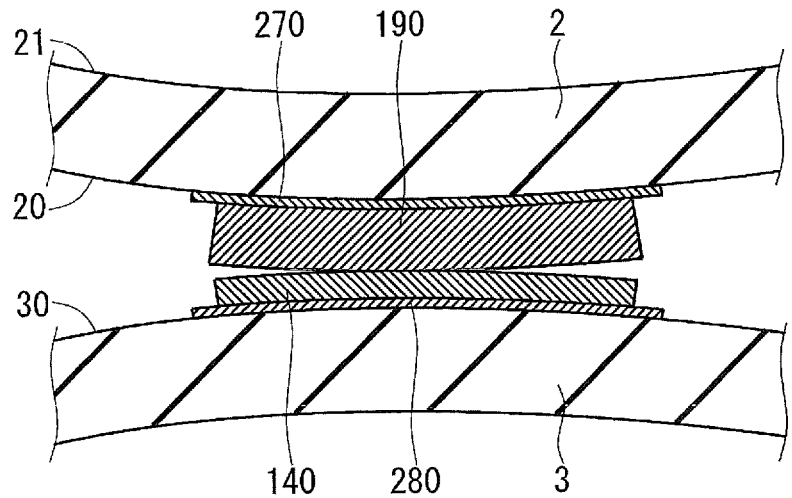
F I G . 1 6
| | DROP HEIGHT | | |
|---|---|---|---|
| | 100cm | 150cm | 200cm |
| FIRST COMPARATIVE APPARATUS | ○ | × | × |
| SECOND COMPARATIVE APPARATUS | ○ | ○ | × |
| THIRD COMPARATIVE APPARATUS | ○ | ○ | × |
| ELECTRONIC APPARATUS ACCORDING TO ONE EMBODIMENT | ○ | ○ | ○ |

…

ELECTRONIC APPARATUS

CROSS-REFERENCE TO RELATED APPLICATION

The present application is a continuation based on PCT Application No. PCT/JP2015/078669 filed on Oct. 8, 2015, which claims the benefit of Japanese Application No. 2014-219494, filed on Oct. 28, 2014. PCT Application No. PCT/JP2015/078669 is entitled "ELECTRONIC APPARATUS", and Japanese Application No. 2014-219494 is entitled "ELECTRONIC APPARATUS". The contents of which are incorporated by reference herein in their entirety.

FIELD

Embodiments of the present disclosure relate to an electronic apparatus.

BACKGROUND

Various technologies have conventionally been proposed for electronic apparatuses.

SUMMARY

An electronic apparatus is disclosed. In one embodiment, an electronic apparatus comprises a panel, a piezoelectric vibrator, a component, and a cushioning material. The panel is located on a surface of the electronic apparatus. The piezoelectric vibrator is located on an inner surface of the panel. The component faces the piezoelectric vibrator. The cushioning material is located between the piezoelectric vibrator and the component such that a gap is formed between the piezoelectric vibrator and the cushioning material.

BRIEF DESCRIPTION OF THE DRAWINGS

FIG. 5 illustrates a view showing an electrical configuration of the electronic apparatus.
FIG. 11 illustrates an enlarged view showing a sectional structure of the electronic apparatus.
FIG. 12 illustrates an enlarged view showing the sectional structure of the electronic apparatus.
FIG. 15 illustrates an enlarged view showing the sectional structure of the electronic apparatus.
FIG. 16 illustrates a view showing results of a drop test.

DETAILED DESCRIPTION

Figure 1:
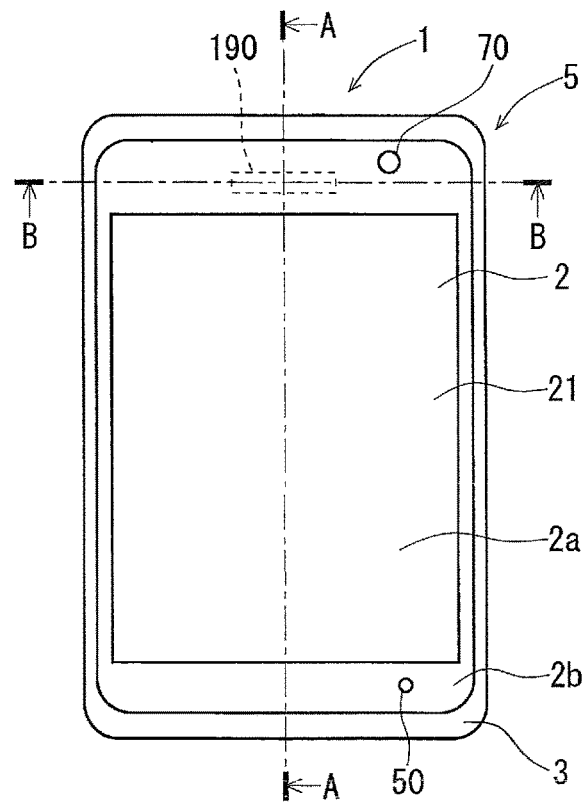
FIG. 1 illustrates a front view showing an external appearance of an electronic apparatus.
Figure 2:
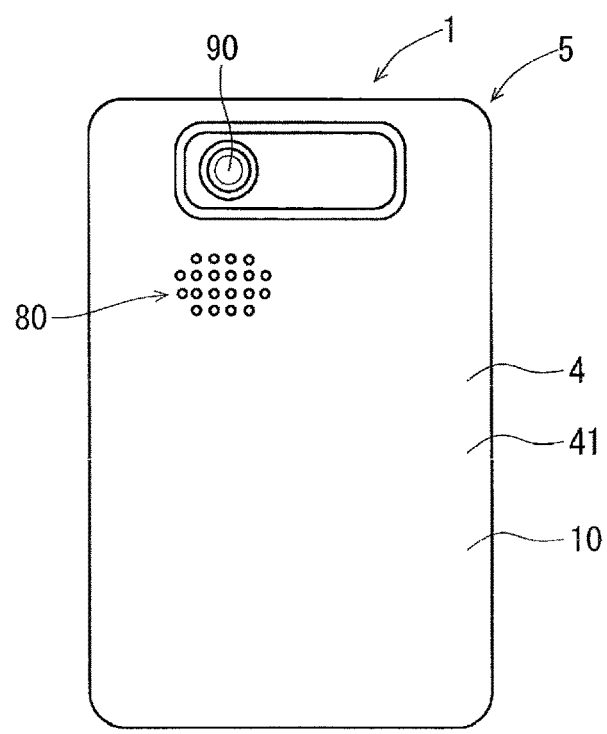
FIG. 2 illustrates a rear view showing the external appearance of the electronic apparatus.
Figure 3:
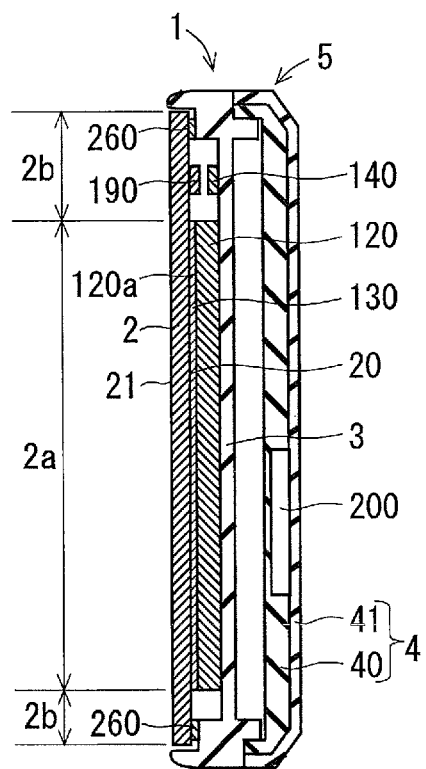
FIG. 3 illustrates a view showing a sectional structure of the electronic apparatus.
Figure 4:
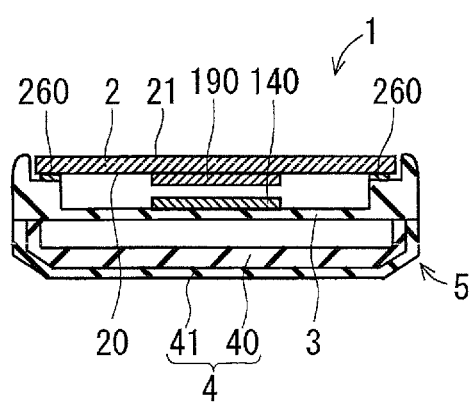
FIG. 4 illustrates a view showing the sectional structure of the electronic apparatus.

<External Appearance of Electronic Apparatus>
FIGS. 1 and 2 respectively illustrate a front view and a rear view showing an external appearance of an electronic apparatus 1. FIG. 3 illustrates a schematic view showing a sectional structure taken along an A-A line of the electronic apparatus 1 illustrated in FIG. 1. FIG. 4 illustrates a schematic view showing the sectional structure taken along a B-B line of the electronic apparatus 1 illustrated in FIG. 1. The electronic apparatus 1 is, for example, a mobile phone such as a smartphone.

As illustrated in FIGS. 1 to 4, the electronic apparatus 1 includes a transparent cover panel 2 covering a display surface 120a of a display panel 120 (FIG. 3), a front case 3 supporting the cover panel 2, and a rear case 4 attached to the front case 3. The cover panel 2, the front case 3, and the rear case 4 each form part of the exterior of the electronic apparatus 1. The rear case 4 includes a case main body 40, which is attached to the front case 3 and accommodates a battery 200, and a cover member 41 attached to the case main body from a rear surface 10 side of the electronic apparatus 1. The battery 200 accommodated in the case main body 40 is covered with the cover member 41. The cover panel 2, the front case 3, and the rear case 4 form an exterior case 5 of the electronic apparatus 1. The electronic apparatus 1 has a substantially rectangular plate shape in a plan view.

The cover panel 2 forms a front portion of the electronic apparatus 1 except for a peripheral end (peripheral portion) of the front portion of the electronic apparatus 1. The front case 3 and the rear case 4 form the peripheral end of the front portion, a side portion, and a rear portion of the electronic apparatus 1. The front case 3 and the rear case 4 are each made of, for example, resin and metal. The resin may be, for example, a polycarbonate resin, an ABS resin, and a nylon-based resin. The metal may be, for example, aluminum. A printed circuit board (not shown) in which various components such as a CPU 101 and a DSP 102 described below are mounted is located in the space enclosed by the front case 3 and the rear case 4.

The cover panel 2 has a plate shape and a substantially rectangular shape in a plan view. A longitudinal direction of the cover panel 2 corresponds with the vertical direction of the electronic apparatus 1. As illustrated in FIG. 3, the cover panel 2 has a first main surface 20 that faces the display surface 120a of the display panel 120 and is located closer to the inside and a second main surface 21 located opposite to the first main surface 20 and located closer to the outside. The second main surface 21 forms part of the front surface of the electronic apparatus 1. Hereinafter, the first main surface 20 may be referred to as an "inner main surface 20", and the second main surface 21 may be referred to as an "outer main surface 21".

The cover panel 2 is made of, for example, acrylic resin, glass, or sapphire. Here, sapphire refers to a monocrystal that contains alumina ($Al_2O_3$) as a main component, and herein, refers to a monocrystal $Al_2O_3$ having a purity of $Al_2O_3$ of approximately 90% or more. The purity of $Al_2O_3$ is preferably greater than or equal to 99% in order to further increase resistance to scratching and to more reliably eliminate or reduce cracks and chipping. In addition, examples of materials for the cover panel 2 include crystalline materials such as diamond, zirconia, titania, crystal, lithium tantalite, and aluminum oxynitride. These materials are preferably a monocrystal having a purity of greater than or equal to approximately 90% in order to further increase resistance to scratching and to more reliably eliminate or reduce cracks and chipping. The cover panel 2 may be a composite panel (laminated panel) of a multilayer structure. For example, the cover panel 2 may be a laminated panel of a two-layered structure that includes a layer of sapphire located on the surface of the electronic apparatus 1 and a layer of glass (glass panel) attached to the layer of sapphire. The cover panel 2 may be a laminated panel of a three-layered structure that includes the layer of sapphire (sapphire panel) located on the surface of the electronic apparatus 1, the layer of glass (glass panel) attached to the layer of sapphire, and a layer of sapphire (sapphire panel) attached to the layer of glass.

The cover panel 2 has a transparent display portion (also referred to as a display window) 2a transmitting the display of the display panel 120. The display portion 2a has, for example, a rectangular shape in a plan view. The visible light output from the display panel 120 passes through the display portion 2a and is emitted to the outside of the electronic apparatus 1. The user can visually recognize information displayed on the display panel 120 through the display portion 2a from the outside of the electronic apparatus 1.

The major portion of a peripheral end (peripheral portion) 2b of the cover panel 2 that surrounds the display portion 2a is opaque and/or not transparent because of, for example, a film or the like that is attached thereto. Accordingly, the major portion of the peripheral end 2b is a non-display portion that does not transmit the display of the display panel 120.

As illustrated in FIG. 3, a touch panel 130 is attached to the inner main surface 20 of the cover panel 2. The display panel 120 being the display is attached to a main surface of the touch panel 130 opposite to a main surface thereof on the inner main surface 20 side. That is, the display panel 120 is installed on the inner main surface 20 of the cover panel 2 with the touch panel 130 therebetween. The display panel 120 is sandwiched between the cover panel 2 and the front case 3. A portion of the cover panel 2 facing the display panel 120 is the display portion 2a. The user can provide various instructions to the electronic apparatus 1 by operating the display portion 2a of the cover panel 2 using the finger or the like.

As illustrated in FIG. 1, a microphone hole 50 is located in the lower end of the cover panel 2. As illustrated in FIG. 2, speaker holes 80 are located in the rear surface 10 of the electronic apparatus 1. Specifically, the speaker holes 80 are located in the outer surface of the cover member 41 of the rear case 4.

A front imagining unit 160, a rear imagining unit 170, and a piezoelectric vibrator 190, which will be described below, are located in the exterior case 5. As illustrated in FIG. 3, the piezoelectric vibrator 190 is located on the inner main surface 20 of the cover panel 2. A cushioning material 140 is located in the exterior case 5. The cushioning material 140 is disposed between the piezoelectric vibrator 190 and a component facing the piezoelectric vibrator 190. For example, the cushioning material 140 is disposed between the piezoelectric vibrator 190 and the front case 3 facing the piezoelectric vibrator 190. The cushioning material 140 is located on the front case 3 so as not to contact the piezoelectric vibrator 190. The functions of the cushioning material 140 will be described below in detail.

A front-surface-lens transparent part 70 through which an imaging lens of the front imaging unit 160 in the exterior case 5 can be visually recognized from the outside of the electronic apparatus 1 is located on the upper end of the cover panel 2. A rear-surface-lens imaging transparent part 90 through which an imaging lens of the rear imaging unit 170 in the exterior case 5 can be visually recognized from the outside of the electronic apparatus 1 is located on the rear surface 10 of the electronic apparatus 1.

As illustrated in FIG. 3, the cover panel 2 is attached to the front case 3 with a bonding material 260. Specifically, the inner main surface 20 of the cover panel 2 is attached to the front case 3 with the bonding material 260 therebetween. For example, the entire periphery of the peripheral end of the inner main surface 20 of the cover panel 2 is attached to the front case 3 with the bonding material 260. The bonding material 260 may be a double-sided tape or an adhesive.

<Electrical Configuration of Electronic Apparatus>

FIG. 5 illustrates a block diagram mainly showing the electrical configuration of the electronic apparatus 1. As illustrated in FIG. 5, the electronic apparatus 1 includes a controller 100, a wireless communication unit 110, the display panel 120, the touch panel 130, and the piezoelectric vibrator 190. The electronic apparatus 1 further includes a microphone 150, the front imaging unit 160, the rear imaging unit 170, an external speaker 180, and the battery 200. The exterior case 5 accommodates the structural components, except for the cover panel 2, of the electronic apparatus 1.

The controller 100 is a control circuit that includes the Central Processing Unit (CPU) 101, the Digital Signal Processor (DSP) 102, and a storage unit 103. The controller 100 can manage the overall operation of the electronic apparatus 1 by controlling the other structural components of the electronic apparatus 1.

The storage unit 103 is a recording medium which is non-transitory such as a Read Only Memory (ROM) and a Random Access Memory (RAM) and is readable by the controller 100 (CPU 101 and DSP 102). A main program, a plurality of application programs, and the like are stored in the storage unit 103, the main program being a control program for controlling the electronic apparatus 1, specifically, for controlling the respective structural components such as the wireless communication unit 110 and the display panel 120 of the electronic apparatus 1. Various functions of the controller 100 can be enabled by the CPU 101 and the DSP 102 executing various programs in the storage unit 103.

Further, in addition to the ROM and RAM, the storage unit 103 may include a non-transitory recording medium, which is readable by a computer. The storage unit 103 may include, for example, a compact hard disk drive and a Solid State Drive (SSD).

The wireless communication unit 110 is a communication circuit that includes an antenna 111. In the wireless communication unit 110, the antenna 111 can receive a signal from a mobile phone different from the electronic apparatus 1, or from a communication device such as a web server connected to the Internet via a base station. The wireless communication unit 110 can perform an amplification process and down conversion on the received signal and output the signal to the controller 100. The controller 100 can perform demodulation processing or the like on the input signal, and acquire a sound signal (sound information) indicating a voice or music included in the received signal.

The wireless communication unit 110 can perform up-converting and the amplification process on a transmission signal including a sound signal or the like generated in the controller 100, and wirelessly transmit the transmission signal after the process from the antenna 111. The transmission signal from the antenna 111 can be received in a communication device connected to the Internet or a mobile phone different from the electronic apparatus 1 via the base station.

The display panel 120 is, for example, a liquid crystal display panel or an organic electro luminescent (EL) panel. The display panel 120 can display various pieces of information such as characters, symbols, and figures by control of the controller 100. The information displayed in the display panel 120 can be visually recognized by the user of the electronic apparatus 1 through the display portion 2a of the cover panel 2.

The touch panel 130 can detect an operation by an operator such as a finger with respect to the display portion 2a of the cover panel 2. The touch panel 130 is, for example, a projection type electrostatic capacitance touch panel. When the user operates the display portion 2a with the operator such as the finger, an electrical signal in response to the operation is input to the controller 100 from the touch panel 130. The controller 100 can specify the details of the operation performed on the display portion 2a based on the electrical signal from the touch panel 130 and perform a process according to the specified details.

In addition, a display panel capable of detecting the operation by the operator such as the finger with respect to the display portion 2a may be provided instead of the touch panel 130 and the display panel 120.

The front imaging unit 160 includes the imaging lens, an image sensor, and the like. The front imaging unit 160 can image a still image and a moving image based on the control by the controller 100. The imaging lens of the front imaging unit 160 can be visually recognized from the front-surface-lens transparent part 70 located on the front surface of the electronic apparatus 1. Therefore, the front imaging unit 160 can image an object in front of the surface side (cover panel 2 side) of the electronic apparatus 1.

The rear imaging unit 170 includes the imaging lens, an image sensor, and the like. The rear imaging unit 170 can image a still image and a moving image based on the control by the controller 100. The imaging lens of the rear imaging unit 170 can be visually recognized from the rear-surface-lens transparent part 90 located on the rear surface 10 of the electronic apparatus 1. Therefore, the rear imaging unit 170 can image an object in front of the rear surface 10 side of the electronic apparatus 1.

The microphone 150 can output a sound from the outside of the electronic apparatus 1 to the controller 100 by converting the sound into an electric sound signal. The sound from the outside of the electronic apparatus 1 is received by the microphone 150 through the microphone hole 50 located in the front surface of the cover panel 2. The microphone hole 50 may be located in the side surface of the electronic apparatus 1 or may be located in the rear surface 10.

The external speaker 180 is, for example, a dynamic speaker. The external speaker 180 can convert the electric sound signal from the controller 100 into a sound and then outputs the sound. The sound output from the external speaker 180 is output from the speaker holes 80 located in the rear surface 10 of the electronic apparatus 1 to the outside. The volume of the sound output from the speaker holes 80 can be set to a degree such that the sound can be heard at a location separated from the electronic apparatus 1.

As described above, the piezoelectric vibrator 190 is located on the inner main surface 20 of the cover panel 2 located on the front surface of the electronic apparatus 1. The piezoelectric vibrator 190 can be vibrated by a drive voltage applied from the controller 100. The controller 100 can generate a drive voltage based on a sound signal, and apply the drive voltage to the piezoelectric vibrator 190. The piezoelectric vibrator 190 is vibrated by the controller 100 based on a sound signal, so that the cover panel 2 vibrates based on the sound signal. A reception sound is accordingly transmitted from the cover panel 2 to the user. The volume of the reception sound can be set to a degree such that the user can properly hear the sound when moving the cover panel 2 close to an ear. The reception sound transmitted from the cover panel 2 to the user will be described below in detail.

The battery 200 can output the power for the electronic apparatus 1. The power output from the battery 200 is supplied to the respective electronic components such as the controller 100 and the wireless communication unit 110 of the electronic apparatus 1.

<Details of Piezoelectric Vibrator>

Figure 6:
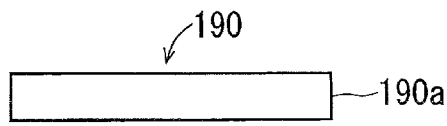
FIG. 6 illustrates a top view showing a structure of a piezoelectric vibrator.
Figure 7:
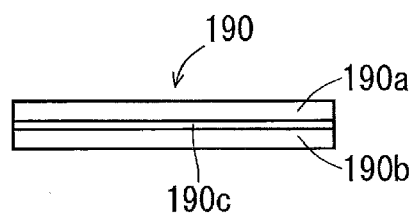
FIG. 7 illustrates a side view showing the structure of the piezoelectric vibrator.

FIGS. 6 and 7 are a top view and a side view, respectively, illustrating a structure of the piezoelectric vibrator 190. As illustrated in FIGS. 6 and 7, the piezoelectric vibrator 190 has a long shape in one direction. Specifically, the piezoelectric vibrator 190 has a long and narrow rectangular plate shape in a plan view. The piezoelectric vibrator 190 has, for example, a bimorph structure. The piezoelectric vibrator 190 includes a first piezoelectric ceramic plate 190a and a second piezoelectric ceramic plate 190b which are bonded to each other with a shim material 190c therebetween.

In the piezoelectric vibrator 190, when a positive voltage is applied to the first piezoelectric ceramic plate 190a and a negative voltage is applied to the second piezoelectric ceramic plate 190b, the first piezoelectric ceramic plate 190a extends along the longitudinal direction and the second piezoelectric ceramic plate 190b contracts along the longitudinal direction. Accordingly, as illustrated in FIG. 8, the piezoelectric vibrator 190 is bent into a convex shape with the first piezoelectric ceramic plate 190a being the outside.

In contrast, in the piezoelectric vibrator 190, when a negative voltage is applied to the first piezoelectric ceramic plate 190a and a positive voltage is applied to the second piezoelectric ceramic plate 190b, the first piezoelectric ceramic plate 190a contracts along the longitudinal direction and the second piezoelectric ceramic plate 190b extends along the longitudinal direction. Accordingly, as illustrated in FIG. 9, the piezoelectric vibrator 190 is bent into a convex shape with the second piezoelectric ceramic plate 190b being the outside.

Figure 8:
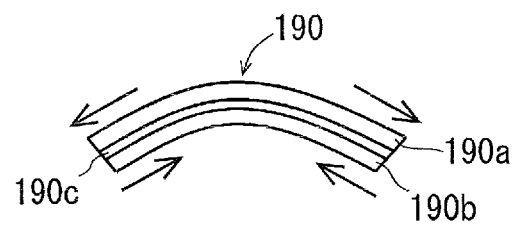
FIG. 8 illustrates how the piezoelectric vibrator vibrates while being bent.
Figure 9:
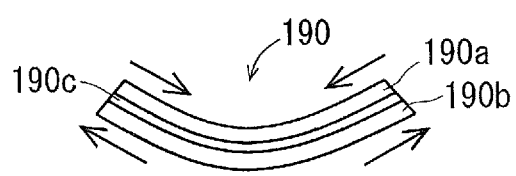
FIG. 9 illustrates how the piezoelectric vibrator vibrates while being bent.

The piezoelectric vibrator 190 vibrates while being bent along the longitudinal direction by alternately taking the state of FIG. 8 and the state of FIG. 9. The controller 100 allows the piezoelectric vibrator 190 to vibrate while being bent along the longitudinal direction by applying an alternating current (AC) voltage in which the positive voltage and the negative voltage alternately appear at an area between the first piezoelectric ceramic plate 190a and the second piezoelectric ceramic plate 190b.

The piezoelectric vibrator 190 having such a structure is disposed on the peripheral end of the inner main surface 20 of the cover panel 2. Specifically, the piezoelectric vibrator 190 is disposed on a central portion in a short-length direction (horizontal direction of the electronic apparatus 1) of the cover panel 2 in the upper end of the inner main surface 20 of the cover panel 2. The piezoelectric vibrator 190 is disposed such that the longitudinal direction thereof extends along the short-length direction of the cover panel 2. In this manner, the piezoelectric vibrator 190 vibrates while being bent along the short-length direction of the cover panel 2. Further, the center of the piezoelectric vibrator 190 in the longitudinal direction corresponds to the center of the cover panel 2 in the short-length direction in the upper end of the inner main surface 20 of the cover panel 2.

As illustrated in FIGS. 8 and 9 mentioned above, the center of the piezoelectric vibrator 190 in the longitudinal direction has the largest displacement amount when the piezoelectric vibrator 190 is vibrating while being bent. Accordingly, an area in the center in the short-length direction in the upper end of the inner main surface 20 of the cover panel 2, which corresponds to the position of the piezoelectric vibrator 190, has the largest displacement amount of bending and vibrating.

Only one structure made of the first piezoelectric ceramic plate 190a and the second piezoelectric ceramic plate 190b, which are bonded to each other with the shim material 190c therebetween, is provided in the piezoelectric vibrator 190 illustrated in FIGS. 6 to 9. Alternatively, a plurality of the structures may be laminated to each other. In this case, the number of layers of the laminated structure of the piezoelectric vibrator 190 is preferably greater than or equal to 28 layers, more preferably, greater than or equal to 44 layers. Thus, a sufficient vibration can be transmitted to the cover panel 2.

The piezoelectric vibrator 190 may be made of an organic piezoelectric material such as polyvinylidene fluoride and polylactic acid in addition to the piezoelectric ceramic material. Specifically, the piezoelectric vibrator 190 may include, for example, a first piezoelectric plate and a second piezoelectric plate that are laminated each other and made of a polylactic acid film. A transparent electrode such as indium-tin-oxide (ITO) may be used as an electrode of the piezoelectric plate.

<Generation of Reception Sound>

The piezoelectric vibrator 190 causes the cover panel 2 to vibrate, so that the air conduction sound and the tissue conduction sound are transmitted from the cover panel 2 to the user. In other words, a vibration of the piezoelectric vibrator 190 itself is transmitted to the cover panel 2, so that the air conduction sound and the tissue conduction sound are transmitted from the cover panel 2 to the user.

Here, the term "air conduction sound" is a sound recognized in the human brain by the vibrations of an eardrum due to a sound wave (air vibration) which enters an external auditory meatus hole (a so-called "ear hole"). On the other hand, the term "tissue conduction sound" is a sound recognized in the human brain by the vibration of the eardrum due to the vibration of an auricle transmitted to the eardrum. Hereinafter, the air conduction sound and the tissue conduction sound will be described in detail.

Figure 10:
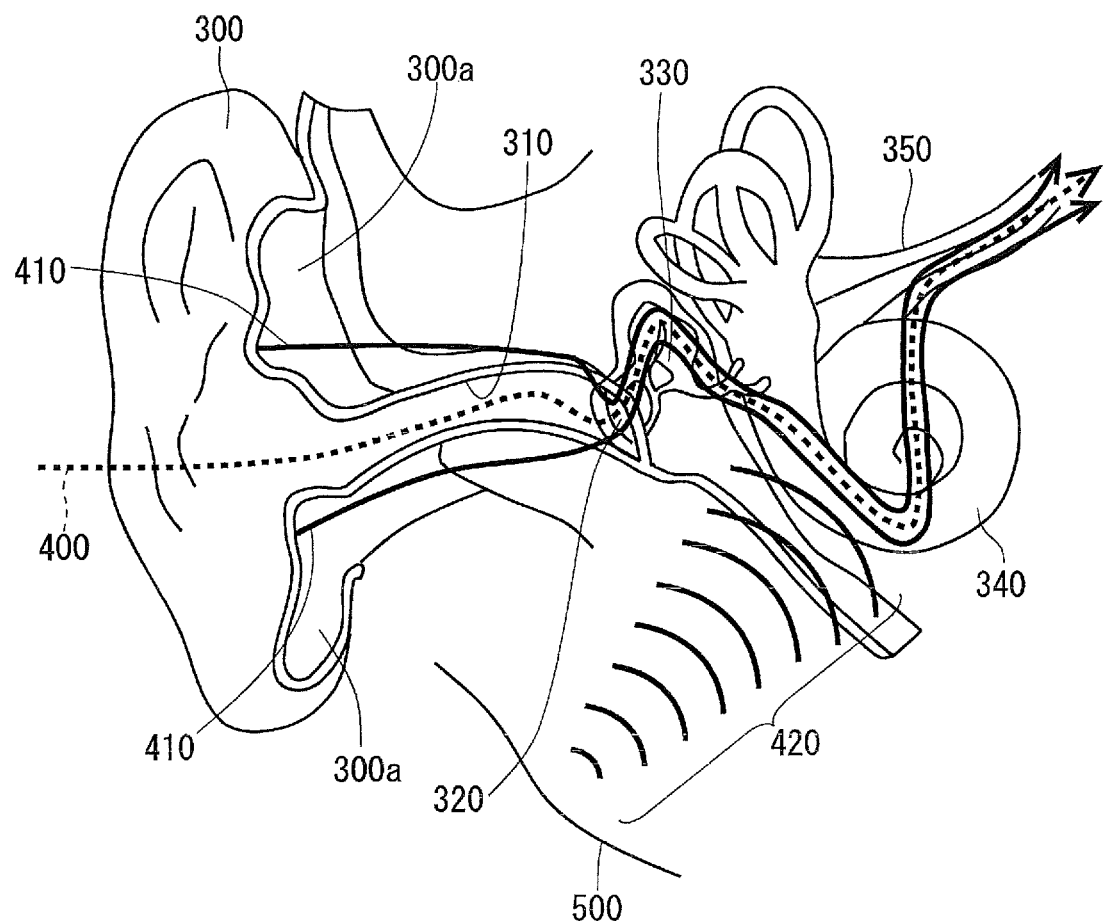
FIG. 10 illustrates a view for describing air conduction sound and tissue conduction sound.

FIG. 10 is a view for describing the air conduction sound and the tissue conduction sound. FIG. 10 illustrates the structure of the ear of the user of the electronic apparatus 1. In FIG. 10, a dotted line 400 indicates a conduction path of a sound signal (sound information) while the air conduction sound is recognized in the human brain. A solid line 410 indicates a conduction path of a sound signal while the tissue conduction sound is recognized in the human brain.

When the piezoelectric vibrator 190 mounted on the cover panel 2 vibrates based on the electric sound signal indicating the reception sound, the cover panel 2 vibrates, and a sound wave is output from the cover panel 2. When the user moves the cover panel 2 of the electronic apparatus 1 to an auricle 300 of the user by holding the electronic apparatus 1 in a hand, or the cover panel 2 of the electronic apparatus 1 is set to (brought into contact with) the auricle 300 of the user, the sound wave output from the cover panel 2 enters an external auditory meatus hole 310. The sound wave from the cover panel 2 travels through the external auditory meatus hole 310 and causes an eardrum 320 to vibrate. The vibration of the eardrum 320 is transmitted to an auditory ossicle 330 and the auditory ossicle 330 vibrates. In addition, the vibration of the auditory ossicle 330 is transmitted to a cochlea 340 and is converted into an electrical signal in the cochlea 340. The electrical signal is transmitted to the brain by passing through an acoustic nerve 350 and the reception sound is recognized in the human brain. In this manner, the air conduction sound is transmitted from the cover panel 2 to the user.

Further, when the user puts the cover panel 2 of the electronic apparatus 1 to the auricle 300 of the user by holding the electronic apparatus 1 in a hand, the auricle 300 is vibrated by the cover panel 2, which is vibrated by the piezoelectric vibrator 190. The vibration of the auricle 300 is transmitted to the eardrum 320, and thus the eardrum 320 vibrates. The vibration of the eardrum 320 is transmitted to the auditory ossicle 330, and thus the auditory ossicle 330 vibrates. The vibration of the auditory ossicle 330 is transmitted to the cochlea 340 and is converted into an electrical signal in the cochlea 340. The electrical signal is transmitted to the brain through the acoustic nerve 350 and the reception sound is recognized in the brain. In this manner, the tissue conduction sound is transmitted from the cover panel 2 to the user. FIG. 10 also illustrates an auricle cartilage 300a in the inside of the auricle 300.

Bone conduction sound is a sound recognized in the human brain by the vibration of the skull and direct stimulation of the inner ear such as the cochlea caused by the vibration of the skull. In FIG. 10, in a case where a jawbone 500 vibrates, the transmission path of the sound signal while the bone conduction sound is recognized in the brain is indicated by a plurality of arcs 420.

As described above, the air conduction sound and the tissue conduction sound can be transmitted from the cover panel 2 to the user of the electronic apparatus 1 due to an appropriate vibration of the cover panel 2 through the vibration of the piezoelectric vibrator 190. The user can hear the air conduction sound from the cover panel 2 by moving the cover panel 2 close to an ear (auricle). Further, the user can hear the air conduction sound and the tissue conduction sound from the cover panel 2 by bringing the cover panel 2 into contact with an ear (auricle). The structure of the piezoelectric vibrator 190 according to one embodiment is contrived to appropriately transmit the air conduction sound and the tissue conduction sound to the user. Various advantages are achieved by forming the electronic apparatus 1 to transmit the air conduction sound and the tissue conduction sound to the user.

For example, since the user can hear a sound when putting the cover panel 2 to the ear, communication using the electronic apparatus 1 can be performed without much concerning of the position of the electronic apparatus 1 with respect to the ear.

If there is a large amount of ambient noise, the user can make it difficult to hear the ambient sound by strongly putting the cover panel 2 to the ear while turning up the volume of the tissue conduction sound. Accordingly, the user can appropriately perform communication even when there is a large amount of the ambient noise.

In addition, even with earplugs or earphones on his/her ears, the user can recognize the reception sound from the electronic apparatus 1 by putting the cover panel 2 to the ear (more specifically, the auricle). Further, even with headphones on his/her ears, the user can recognize the reception sound from the electronic apparatus 1 by putting the cover panel 2 to the headphones.

The portion of the cover panel 2 on which the piezoelectric vibrator 190 is mounted vibrates relatively easily. Thus, the user can easily hear the sound from the cover panel 2 by moving the upper end (particularly, the central portion in the short-length direction of the upper end) of the cover member 2, on which the piezoelectric vibrator 190 is mounted, close to the ear or by putting the portion to the ear.

<With Regard to Cushioning Material>

FIG. 11 illustrates an enlarged view showing the vicinity of the piezoelectric vibrator 190 and the cushioning material 140 in the sectional structure illustrated in FIG. 3. FIG. 12 illustrates an enlarged view showing the vicinity of the piezoelectric vibrator 190 and the cushioning material 140 in the sectional structure illustrated in FIG. 4.

As illustrated in FIGS. 11 and 12, the piezoelectric vibrator 190 is attached to the inner main surface 20 of the cover panel 2 with a bonding material 270. The cushioning material 140 is attached to a main surface 30 of the front case 3 on the cover panel 2 side with a bonding material 280. The cushioning material 140 is made of, for example, a foam material. A urethane foam material, a polyolefin foam material, or a polyester foam material, for example, is used as the foam material. Each of the bonding materials 270, 280 is, for example, the double-sided tape or the adhesive.

In a case where the touch panel 130 extends to the upper end of the cover panel 2, the piezoelectric vibrator 190 may be located on the inner main surface 20 of the cover panel 2 with the touch panel 130 therebetween.

The cushioning material 140 makes the piezoelectric vibrator 190 less likely to break upon impact on the electronic apparatus 1 when, for example, the electronic apparatus 1 is dropped. The cushioning material 140 is located between the piezoelectric vibrator 190 and the front case 3 such that a gap 290 is formed between piezoelectric vibrator 190 and the cushioning material 140. The piezoelectric vibrator 190 and the cushioning material 140 face each other. The piezoelectric vibrator 190 has a thickness t1 greater than, for example, a thickness t2 of the cushioning material 140. The cushioning material 140 has the thickness t2 set to, for example, 0.3 mm.

The gap 290 has a dimension (length) d between the piezoelectric vibrator 190 and the cushioning material 140 set to a degree such that, for example, the cushioning material 140 does not contact the piezoelectric vibrator 190 vibrated by the controller 100 (the piezoelectric vibrator 190 during vibration).

The dimension d of the gap 290 is a value based on an amplitude of the piezoelectric vibrator 190, variations in the thickness t1 of the piezoelectric vibrator 190, and variations in a thickness t3 of the front case 3. For example, the amplitude of the piezoelectric vibrator 190 is approximately 0.2 mm, and the sum (hereinafter referred to as a "variation maximum value") of a maximum value of the variations in the thickness t1 of the piezoelectric vibrator 190 and a maximum value of the variations in the thickness t3 of the front case 3 is approximately 0.1 mm. For example, the sum of the amplitude of the piezoelectric vibrator 190 and the variation maximum value is slightly smaller than 0.3 mm. In this case, a design value of the dimension d of the gap 290 is set to a value slightly greater than the sum of the amplitude of the piezoelectric vibrator 190 and the variation maximum value, for example, 0.3 mm. For this reason, the cushioning material 140 can make the piezoelectric vibrator 190 during vibration hardly contact the front case 3 even in a case where the thicknesses of the piezoelectric vibrator 190 and the front case 3 vary. Thus, the vibration of the piezoelectric vibrator 190 can be less likely to be interrupted by the cushioning material 140, and the sound can be less likely to be hardly transmitted from the electronic apparatus 1 to the user.

As described above, the cushioning material 140 is located between the piezoelectric vibrator 190 and the front case 3, so that the piezoelectric vibrator 190 can be less likely to break upon the impact on the electronic apparatus 1 when, for example, the electronic apparatus 1 is dropped. This point will be described below in detail.

Figure 13:
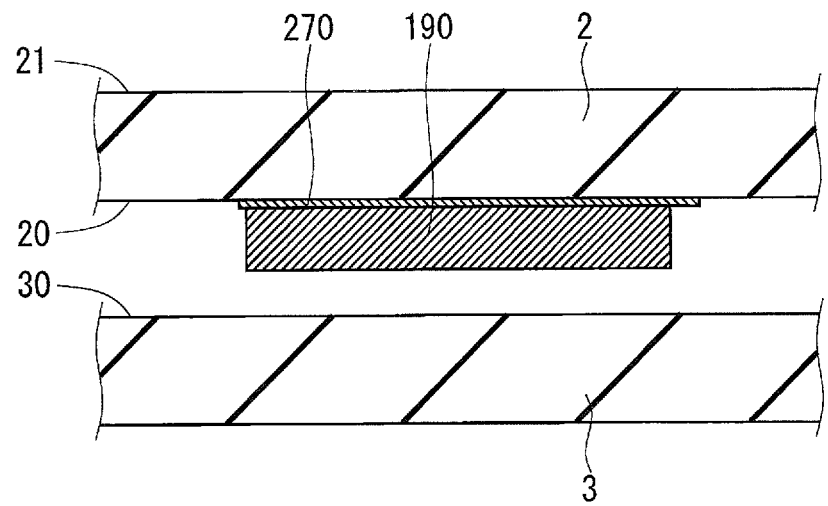
FIG. 13 illustrates an enlarged view showing a sectional structure of a first comparative apparatus.

FIG. 13 illustrates a view schematically showing a sectional structure of the electronic apparatus 1 that does not include the cushioning material 140 (hereinafter referred to as a "first comparative apparatus"). The sectional structure illustrated in FIG. 13 corresponds to the sectional structure illustrated in FIG. 12. In the first comparative apparatus, a distance between the piezoelectric vibrator 190 and the front case 3 is set to, for example, 0.3 mm.

Figure 14:
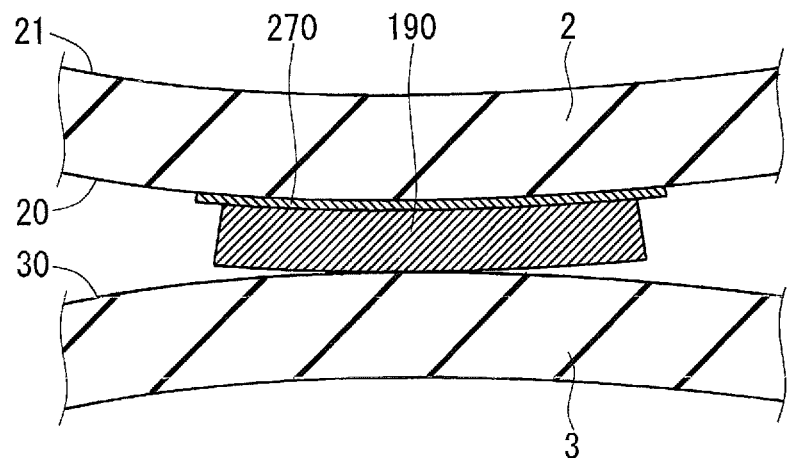
FIG. 14 illustrates an enlarged view showing the sectional structure of the first comparative apparatus.

FIG. 14 illustrates a view schematically showing the sectional structure of the first comparative apparatus to which an impact is applied when the first comparative apparatus is dropped to the floor or the like. When the first comparative apparatus is dropped to the floor or the like and the impact is applied to the first comparative apparatus, the front case 3 may contact the piezoelectric vibrator 190 as illustrated in FIG. 14. As a result, the piezoelectric vibrator 190 may break. Although both of the cover panel 2 and the front case 3 are bent by the impact on the first comparative apparatus in one example of FIG. 14, one of the cover panel 2 and the front case 3 may be bent and the front case 3 may contact the piezoelectric vibrator 190.

As described above, the front case 3 may contact the piezoelectric vibrator 190 due to the impact on the first comparative apparatus and the piezoelectric vibrator 190 may break in the first comparative apparatus that does not include the cushioning material 140.

Thus, it is assumed that the piezoelectric vibrator 190 hardly contacts the front case 3 by increasing the distance between the piezoelectric vibrator 190 and the front case 3. For example, the electronic apparatus 1 in which a distance between the piezoelectric vibrator 190 and the front case 3 is set to 0.6 mm (hereinafter referred to as a "second comparative apparatus") is assumed.

However, also in the second comparative apparatus, the front case 3 may contact the piezoelectric vibrator 190 upon a strong impact on the second comparative apparatus and the piezoelectric vibrator 190 may break.

Further, the front case 3 may be located so as not to face the piezoelectric vibrator 190 such that the piezoelectric vibrator 190 does not contact the front case 3. In this case, the piezoelectric vibrator 190 can be less likely to break due to the contact of the front case 3 with the piezoelectric vibrator 190. However, also in the electronic apparatus 1 in which the front case 3 does not face the piezoelectric vibrator 190 (hereinafter referred to as a "third comparative apparatus"), the piezoelectric vibrator 190 may break upon the impact on the electronic apparatus 1. Specifically, the cover panel 2 is bent by the impact on the third comparative apparatus, and, as a result, the piezoelectric vibrator 190 may be greatly bent. At this time, the piezoelectric vibrator 190 may break due to bending itself.

In contrast, the electric apparatus 1 includes the cushioning material 140 located between the piezoelectric vibrator 190 and the front case 3, so that the piezoelectric vibrator 190 can be less likely to break due to the contact of the front case 3 with the piezoelectric vibrator 190.

Furthermore, the cushioning material 140 is located between the piezoelectric vibrator 190 and the front case 3 such that the gap 290 is formed between the piezoelectric vibrator 190 and the cushioning material 140. Thus, the vibration of the piezoelectric vibrator 190 can be less likely to be interrupted by the cushioning material 140.

The design value of the dimension d of the gap 290 is set to 0.3 mm in the electronic apparatus 1 while the amplitude of the piezoelectric vibrator 190, the variations in the thickness t1 of the piezoelectric vibrator 190, and the variations in the thickness t3 of the front case 3 are taken into consideration, as described above. Thus, in a case (see FIG. 15) where the piezoelectric vibrator 190 is bent due to the impact on the electronic apparatus 1 and the cushioning material 140 contacts the piezoelectric vibrator 190, the cushioning material 140 contacts the piezoelectric vibrator 190 before the piezoelectric vibrator 190 breaks due to bending. In other words, the cushioning material 140 makes the piezoelectric vibrator 190 less likely to be bent before the piezoelectric vibrator 190 breaks due to bending. Therefore, in contrast to the third comparative apparatus, the cushioning material 140 can make the piezoelectric vibrator 190 less likely to be excessively bent due to the impact on the electronic apparatus 1. As a result, the piezoelectric vibrator 190 can be further less likely to break due to the impact on the electronic apparatus 1.

FIG. 16 illustrates a view showing results of a drop test performed on each of the first comparative apparatus, the second comparative apparatus, the third comparative apparatus, and the electronic apparatus 1 according to one embodiment. In FIG. 16, "∘" indicates that the piezoelectric vibrator 190 does not break in the drop test, and "x" indicates that the piezoelectric vibrator 190 breaks in the drop test. FIG. 16 shows the results in cases where tested apparatuses are dropped to a drop test plate from each height of 100 cm, 150 cm, and 200 cm.

The tested apparatuses are each dropped to the drop test plate from each of the heights for 18 times in the drop test. Specifically, the tested apparatuses are each dropped for three times such that the front surfaces (surfaces on the cover panel 2 side) thereof face the drop test plate (face downward), and are each dropped for three times such that the rear surfaces (surfaces on the cover member 41 side) thereof face the drop test plate. Further, the tested apparatuses are each dropped for three times such that the upper-side surfaces thereof face the drop test plate, and are each dropped for three times such that the lower-side surfaces thereof face the drop test plate. Then, the tested apparatuses are each dropped for three times such that the right-side surfaces thereof face the drop test plate, and are each dropped for three times such that the left-side surfaces thereof face the drop test plate. After the tested apparatuses are each dropped to the drop test plate for 18 times in this manner, "x" is indicated when the piezoelectric vibrator 190 breaks and "∘" is indicated when the piezoelectric vibrator 190 does not break. The drop test plate used in the drop test has a length of 400 mm, a width of 400 mm, and a thickness of 25 mm, and is made of carbon steel referred to as S50C. The surface of the drop test plate is coated with unichrome plating.

As illustrated in FIG. 16, for the first comparative apparatus in which the cushioning material 140 is not provided and the distance between the piezoelectric vibrator 190 and the front case 3 is set to 0.3 mm, the piezoelectric vibrator 190 does not break when the first comparative apparatus is dropped from the height of 100 cm, but the piezoelectric vibrator 190 breaks when the first comparative apparatus is dropped from the heights of 150 cm and 200 cm.

For the second comparative apparatus in which the cushioning material 140 is not provided and the distance between the piezoelectric vibrator 190 and the front case 3 is set to 0.6 mm, the piezoelectric vibrator 190 does not break when the second comparative apparatus is dropped from the heights of 100 cm and 150 cm, but the piezoelectric vibrator 190 breaks when the second comparative apparatus is dropped from the height of 200 cm. Similarly, for the third comparative apparatus in which the cushioning material 140 is not provided and the piezoelectric vibrator 190 does not face the front case 3, the piezoelectric vibrator 190 does not break when the third comparative apparatus is dropped from the heights of 100 cm and 150 cm, but the piezoelectric vibrator 190 breaks when the third comparative apparatus is dropped from the height of 200 cm.

In contrast, for the electronic apparatus 1, the piezoelectric vibrator 190 does not break even when the electronic apparatus 1 is dropped from the height of 200 cm. Therefore, it can be said from the results of the drop test illustrated in FIG. 16 that the piezoelectric vibrator 190 extremely hardly breaks in the electronic apparatus 1.

Although the component facing the piezoelectric vibrator 190 is the front case 3 in one example described above, the component may be another component. For example, the component facing the piezoelectric vibrator 190 may be an electronic component or the like located on the front case 3.

The technology of the disclosure is applicable to other electronic apparatuses in addition to the mobile phones. For example, the technology of the disclosure is also applicable to tablet terminals and wearable mobile electronic apparatuses worn in the arm or the like.

While the electronic apparatus 1 has been described above in detail, the above description is in all aspects illustrative and not restrictive. In addition, various modifications described above are applicable in combination as long as they are not mutually inconsistent. It is understood that numerous modifications which have not been exemplified can be devised without departing from the scope of the present disclosure.

The invention claimed is:

1. An electronic apparatus, comprising:
    a panel located on a surface of the electronic apparatus;
    a piezoelectric vibrator located on an inner surface of the panel, including a first surface facing the inner surface and a second surface located opposite to the first surface;
    a component facing the second surface of the piezoelectric vibrator; and
    a cushioning material located between the second surface of the piezoelectric vibrator and the component such that a gap is formed between the piezoelectric vibrator and the cushioning material,
    wherein an entire region to be visible when the piezoelectric vibrator is seen from the side of the second surface, and to be included in the piezoelectric vibrator, does not contact other materials when the piezoelectric vibrator is not bent.

2. The electronic apparatus according to claim 1, wherein the gap has a dimension set to a degree such that the cushioning material does not contact the piezoelectric vibrator during vibration.

3. The electronic apparatus according to claim 2, wherein the dimension of the gap is a value based on an amplitude of the piezoelectric vibrator, variations in a thickness of the piezoelectric vibrator, and variations in a thickness of the component.

4. The electronic apparatus according to claim 1, wherein in a case where the piezoelectric vibrator is bent due to an impact on the electronic apparatus and the cushioning material contacts the piezoelectric vibrator, the cushioning material contacts the piezoelectric vibrator before the piezoelectric vibrator breaks due to bending.

5. The electronic apparatus according to claim 1, wherein the component comprises a case that forms part of an exterior of the electronic.

6. The electronic apparatus according to claim 1, wherein the cushioning material is configured to make the piezoelectric vibrator less likely to break.

* * * * *